United States Patent
Johnson et al.

(10) Patent No.: US 7,328,943 B2
(45) Date of Patent: Feb. 12, 2008

(54) ADJUSTABLE STORAGE SEAT FOR RECREATION AND UTILITY VEHICLES

(75) Inventors: Barry Johnson, Roseau, MN (US);
Norman Berg, Roseau, MN (US);
Timothy Storo, Roseau, MN (US);
Robert Aronson, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 11/073,054

(22) Filed: Mar. 4, 2005

(65) Prior Publication Data

US 2005/0212335 A1 Sep. 29, 2005

Related U.S. Application Data

(62) Division of application No. 10/619,054, filed on Jul. 14, 2003, now Pat. No. 7,008,014.

(51) Int. Cl.
*B62J 1/00* (2006.01)
*A47C 7/62* (2006.01)

(52) U.S. Cl. .............. 297/188.1; 297/188.09; 297/215.12; 180/190

(58) Field of Classification Search .......... 297/188.1, 297/188.09, 215.11, 215.12; 180/190
See application file for complete search history.

(56) References Cited

U.S. PATENT DOCUMENTS

| | | | | |
|---|---|---|---|---|
| 3,453,025 A | * | 7/1969 | Grant | 297/188.1 |
| 3,779,597 A | * | 12/1973 | Uchida | 297/188.1 |
| 3,927,727 A | * | 12/1975 | Hanagan | 297/188.1 |
| 4,102,549 A | | 7/1978 | Morrison et al. | 297/383 |
| 4,563,038 A | | 1/1986 | Hirose | 297/243 |
| 5,094,315 A | * | 3/1992 | Taki et al. | 297/188.1 |
| 5,518,291 A | | 5/1996 | Shaide | 297/215.12 |
| 5,894,810 A | | 4/1999 | Orr | 114/343 |
| 5,975,629 A | | 11/1999 | Lorbiecki | 297/200 |
| 6,007,150 A | | 12/1999 | Clerkin | 297/215 |
| 6,035,802 A | | 3/2000 | Lussier | 114/363 |
| 6,135,047 A | | 10/2000 | Miller | 114/343 |
| 6,158,378 A | | 12/2000 | Tsumiyama et al. | 114/363 |
| 6,182,590 B1 | | 2/2001 | Patera | 114/55 |
| 6,491,124 B1 | * | 12/2002 | Thompson et al. | 297/215.12 |
| 6,659,560 B1 | | 12/2003 | Chi | 297/383 |
| 2001/0047900 A1 | | 12/2001 | Fecteau et al. | 180/190 |
| 2002/0040822 A1 | | 4/2002 | Gagnon et al. | 180/248 |

* cited by examiner

*Primary Examiner*—Anthony D. Barfield
(74) *Attorney, Agent, or Firm*—Baker & Daniels LLP

(57) ABSTRACT

An adjustable storage seat for recreation and utility vehicles is disclosed. The adjustable storage seat may be used for snowmobiles, watercraft, all-terrain vehicles, or other similar small vehicle intended for entertainment and transportation. The adjustable storage seat comprises a cushion mounted over a frame which is attached to the chassis of the vehicle. The seat is provided with an adjustable backrest which can be adjusted forward or backward in increments to increase the comfort of the rider when a button on the seat is pushed, but otherwise remains fixed in place. The adjustable backrest can also be removed from the seat to reveal a storage compartment after turning it 90 degrees. The seat may be provided with a lock to secure the storage compartment. Additional embodiments of the adjustable storage seat are convertible for one or two person use, and may be provided with internal storage or item racks.

21 Claims, 11 Drawing Sheets

ADJUSTABLE STORAGE SEAT FOR RECREATION AND UTILITY VEHICLES

The present application is a divisional of U.S. patent application Ser. No. 10/619,054, filed Jul. 14, 2003, now U.S. Pat. No. 7,008,014 and the entire disclosure of which is incorporated herein by reference.

FIELD OF THE INVENTION

The present invention relates to an adjustable seat for vehicles. More particularly, the present invention relates to a seat for small vehicles that has an adjustable backrest that can be removed to access a concealed storage area.

BACKGROUND OF THE INVENTION

Small vehicles such as recreation and utility vehicles have continued to increase in popularity. These include small vehicles such as snowmobiles, all terrain vehicles, and personal watercraft, as well as a variety of utility vehicles such as riding lawnmowers and utility tractors. One of the reasons behind the success of these vehicles is that, as a result of their small size, they are maneuverable, relatively inexpensive, and provide their rider with significant freedom of movement. Unfortunately, these vehicles generally share a number of undesirable traits as well, such as a rough and uncomfortable ride, and a minimal capacity to store the travel supplies and personal items of the riders.

Various efforts have been made to deal with the issues of rider discomfort and lack of storage space in small recreation and utility vehicles. For example, personal watercraft are commonly provided with a storage compartment arranged to lie within the hull of the watercraft. Typically this consists of a removable container which is inserted into an opening in the hull, with a lid to cover the opening of the container and inhibit influx of water. A compartment of this type is described in U.S. Pat. No. 6,276,290 to Yamada et al. U.S. Pat. No. 6,523,634, on the other hand, describes an all terrain vehicle with a front storage compartment. This compartment is a hatched container, preferably removable, placed in front of the driver.

Two other patents describe different approaches to increasing the storage capacity available in snowmobiles. U.S. Pat. No. 6,371,233 to Ishii describes a storage trunk positioned towards the rear of a snowmobile seat that can be illuminated by the rear running lights of the snowmobile. This trunk is accessed by opening a trunk lid towards the rear of the vehicle. U.S. Pat. No. 6,179,184 to Hayes describes an attachable luggage for sports vehicles such as snowmobiles which can be attached to the rear of a snowmobile seat.

Different techniques have been used to attempt to reduce rider discomfort. A bladder positioned beneath the seat is described in U.S. Pat. Nos. 5,975,629 and 6,184,590, while various others have described the use of cushion material in the construction of the seat itself. U.S. Pat. No. 4,779,695 to Yasui, on the other hand, describes a snowmobile seat that incorporates a fixed backrest to reduce rider discomfort.

While the aforementioned patents provide useful advances in the art, none have provided an adjustable seat for small recreation and utility vehicles that both increases riding comfort while providing convenient access to a storage area.

SUMMARY OF THE INVENTION

According to a first aspect of the invention, there is provided an adjustable storage seat for recreation and utility vehicles that increases rider comfort while providing a conveniently accessible storage area. The adjustable storage seat includes a cushion mounted over a frame which is attached to the chassis of the vehicle, as well as an enclosed storage area below the frame. The seat is provided with an adjustable backrest which can be adjusted forward or backward in increments to increase the comfort of the rider if a button on the seat is pushed and force is applied, but otherwise remains fixed in place. The adjustable backrest is both simple to use, and provides for a more comfortable ride by allowing the rider to provide support at the position desired. The adjustable backrest can also be removed from the seat to reveal a storage compartment, by turning it 90 degrees such that it clears a specially shaped aperture, but will not rotate unless activated by the rider. The seat may be provided with a lock to secure the storage compartment by preventing removal of the adjustable backrest.

More specifically, a vehicle seat is provided including a frame section including an aperture and configured for mounting on a small vehicle; a cushion section disposed on the frame section; the cushion section having an upper surface on which a rider may sit; a trunk enclosure attached to the lower surface of the frame section that encloses a storage cavity useful for holding items, wherein the user has access to the storage cavity through the aperture provided in the frame section; and an adjustable backrest disposed over the aperture on the frame section. Examples of small vehicles that may use the adjustable seat of the present invention includes snowmobiles, all terrain vehicles, personal watercraft, riding lawnmowers, and utility tractors. Preferably, the adjustable backrest may be repositioned backwards and forwards to various points on the vehicle seat. A button may be included to enable repositioning of the adjustable backrest when pushed.

Another aspect of the vehicle seat is an adjustable backrest that may be removed from the vehicle seat. Removal of the adjustable backrest preferably provides access to the storage cavity. Generally, the adjustable backrest may be removed only after turning it 90 degrees to either side. In a particular embodiment, the invention further includes locking means to prevent removal of the adjustable backrest from the vehicle seat. The locking means may include a spring-mounted peg which extends from the backrest mounting cylinder into a notch within the vehicle seat. The spring-mounted peg prevents removal of the vehicle seat when extended, as it abuts against the notch and prevents rotation. A lock pin can be used to press the spring-mounted peg out of the notch, enabling rotation and hence removal of the adjustable backrest. The lock pin can be locked to prevent access by those without a key.

Another aspect of the vehicle seat is an adjustable backrest for a vehicle seat including a backrest and adjustment means for repositioning the backrest backwards and forwards to various points on the vehicle seat. The adjustment means may include one or more depressed tracks underneath the backrest, wherein the depressed tracks are partially covered by retaining brackets; a platform with one or more track guides that are slidably sandwiched between the depressed tracks and the retaining brackets; and connector contiguous with the platform which detachably connects the platform to the vehicle seat.

The adjustable backrest may further utilize adjustment means including a button mechanism including a rod inside a spring with a button at one end and a plunger knob at the other end; means of securing the button mechanism to the backrest such that the button is accessible; and a generally linear aperture on the platform with a plurality of plunger knob-shaped openings spaced along the linear aperture; wherein the plunger knob prevents movement of the backrest when engaged within an open, and wherein the plunger knob can be temporarily disengaged from the opening when the button is pushed to allow movement, and wherein the spring urges the plunger knob into an opening when the button is not pressed and the plunger knob has been positioned over an opening by movement of the backrest along the vehicle seat.

Thus, in one aspect, the present invention is adjustable storage seat for a small vehicle, including a vehicle seat with an aperture leading to a storage cavity in which items can be stored; a backrest positioned over the aperture to support a rider on the seat that can be adjusted forward or backward to various positions when enabled by pushing a button on the backrest; and locking means that prevent the removal of the backrest from the aperture unless unlocked. The backrest may further include a storage compartment or item rack to supplement that storage capacity provided by the storage cavity within the vehicle seat.

In a further aspect of the present invention, the backrest may include a crest and surface cushion region such that the backrest may be used simultaneously as a backrest and as a vehicle seat for an additional rider. This backrest may also be provided in a convertible form that allows it to be converted between use for a single rider and two riders by rotating the backrest 180 degrees to reverse its alignment.

BRIEF DESCRIPTION OF THE DRAWINGS

The above and other objects and aspects of the invention will be apparent from the description of embodiments illustrated by the following accompanying drawings.

DETAILED DESCRIPTION OF THE PRESENTLY PREFERRED EMBODIMENTS OF THE INVENTION

Reference will now be made to the drawings in which the various elements of the preferred embodiments of the present invention will be given numerical designations and in which the invention will be discussed so as to enable one skilled in the art to make and use the invention.

It is noted that a snowmobile is merely an example vehicle for which the seat of the present invention can be used. Although the present invention will be shown and described in the context of a snowmobile seat, the present invention can also be employed for other small vehicles such as personal watercraft, all-terrain vehicles, a variety of utility vehicles, and the like, in a manner that would be apparent to those of ordinary skill in the art.

Figure 1:
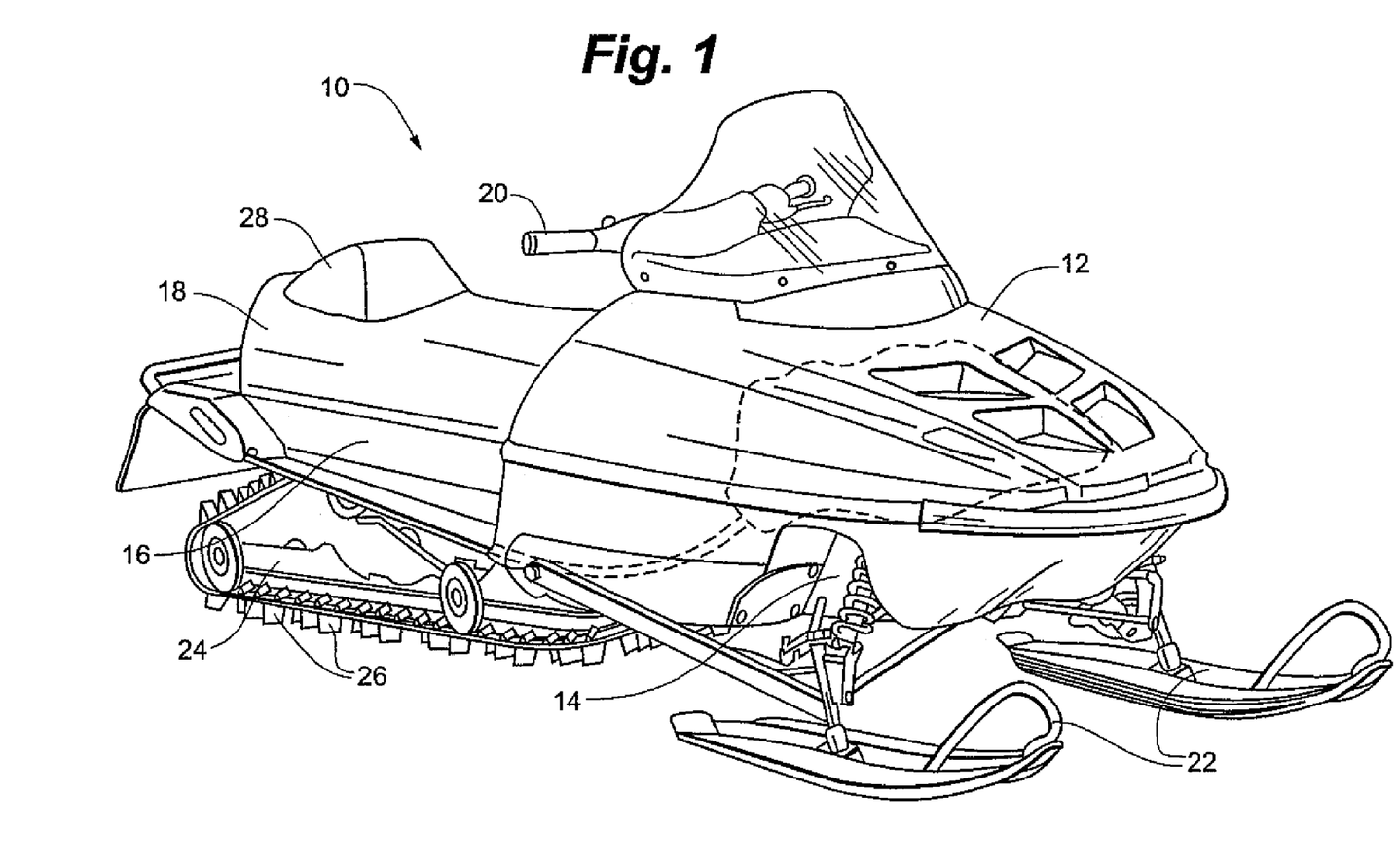
FIG. 1 is a perspective view of a snowmobile having an adjustable storage seat in accordance with an embodiment of the present invention.

A snowmobile 10 having an adjustable storage seat in accordance with one embodiment of the invention is illustrated in FIG. 1. The snowmobile 10 includes a body assembly 12 made up of a number of parts which may be formed of suitable materials, such as plastic or synthetic resin, that cover and protect a support frame or chassis 14. The chassis 14 further includes a rear chassis portion 16 that accommodates a seat 18 adapted to seat one or more riders in straddle fashion. A handlebar assembly 20, positioned forwardly of the seat, is conventionally connected to a pair of front skis 22 for steering the snowmobile. The skis 22 are supported by a suitable front suspension system that is connected to the chassis 14. The central axis of the snowmobile 10 is a conceptual line running from the front of the vehicle to the back of the vehicle, evenly dividing the vehicle into two similar halves.

Rearward of the front skis 22 and beneath the seat 18, the rear chassis 16 suspends an endless track assembly 24 by a suitable suspension. The endless track 24 has a plurality of spaced ribs 26 which extend from the exterior surface of the track. These ribs 26 not only provide traction to the endless track 24 but may also assist the operation of the cooling system. The endless track 24 is driven by an internal combustion engine that is supported by the rear chassis 16 and located in an engine compartment within the body 12 towards the front of the snowmobile 10. An adjustable backrest 28 is positioned towards the rear of the vehicle seat 18, as will be described in more detail below.

Figure 2A:
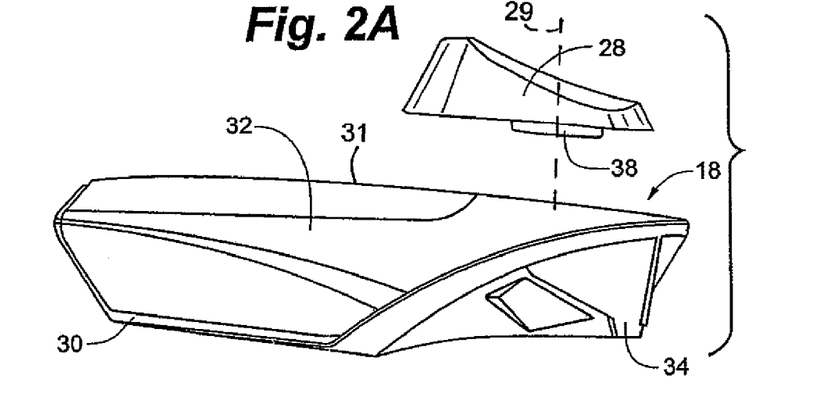
FIG. 2A is a side view of a vehicle seat with an adjustable backrest uncoupled from the seat, according to an embodiment of the present invention.

FIG. 2A is a side view of a vehicle seat 18 with an adjustable backrest 28 uncoupled from the seat, according to a preferred embodiment of the present invention. The vehicle seat 18 includes three main parts: a frame section 30; a seat cushion 32; and a trunk enclosure 34: The middle component of the vehicle seat 18 is the frame section 30 that provides support and structure for the seat. In some arrangements, the frame 30 is formed from metals such as steel or aluminum. In other, more lightweight arrangements, the frame 30 can be formed from resin materials such as thermoplastics. The frame 30 is a generally planar structure that supports the seat cushion 32. The frame 30 is positioned over the body of the snowmobile 10 and is secured to the body of the snowmobile 10 in any suitable manner. In a preferred embodiment, the frame 30 is attached to the chassis of the vehicle in the front using two tongues (not shown) that fit under the gas tank (not shown), while two self tapping fasteners (not shown) are used to secure the frame 30 at the rear of the vehicle.

Supported above the frame 30 is the seat cushion 32. The seat cushion 32 is preferably formed of a material which provides structure and support, but will compress slightly under pressure to increase rider comfort. A material exhibiting these characteristics is a closed cell foam formed of expanded polypropylene. Alternately, an open cell expanded polyethylene foam may be used, particularly in some high performance racing vehicles. In a preferred embodiment, the seat cushion includes an upper and lower portion, with the upper portion formed by a comfortable, compressible open cell foam, while the lower portion includes a more stiff, closed cell foam to provide greater support. The seat cushion 32 is generally adapted to fit above the frame 30 and provide a comfortable surface to support the rider. The seat cushion 32 is generally covered with a seat cover (not shown), preferably constructed of vinyl, designed to slip over the outside of the vehicle seat 18. The seat cover may be secured to the vehicle seat 18 by staples fired through the seat cover and into the frame, or by various other securing structures such as buttons or other attachment points.

Figure 3:
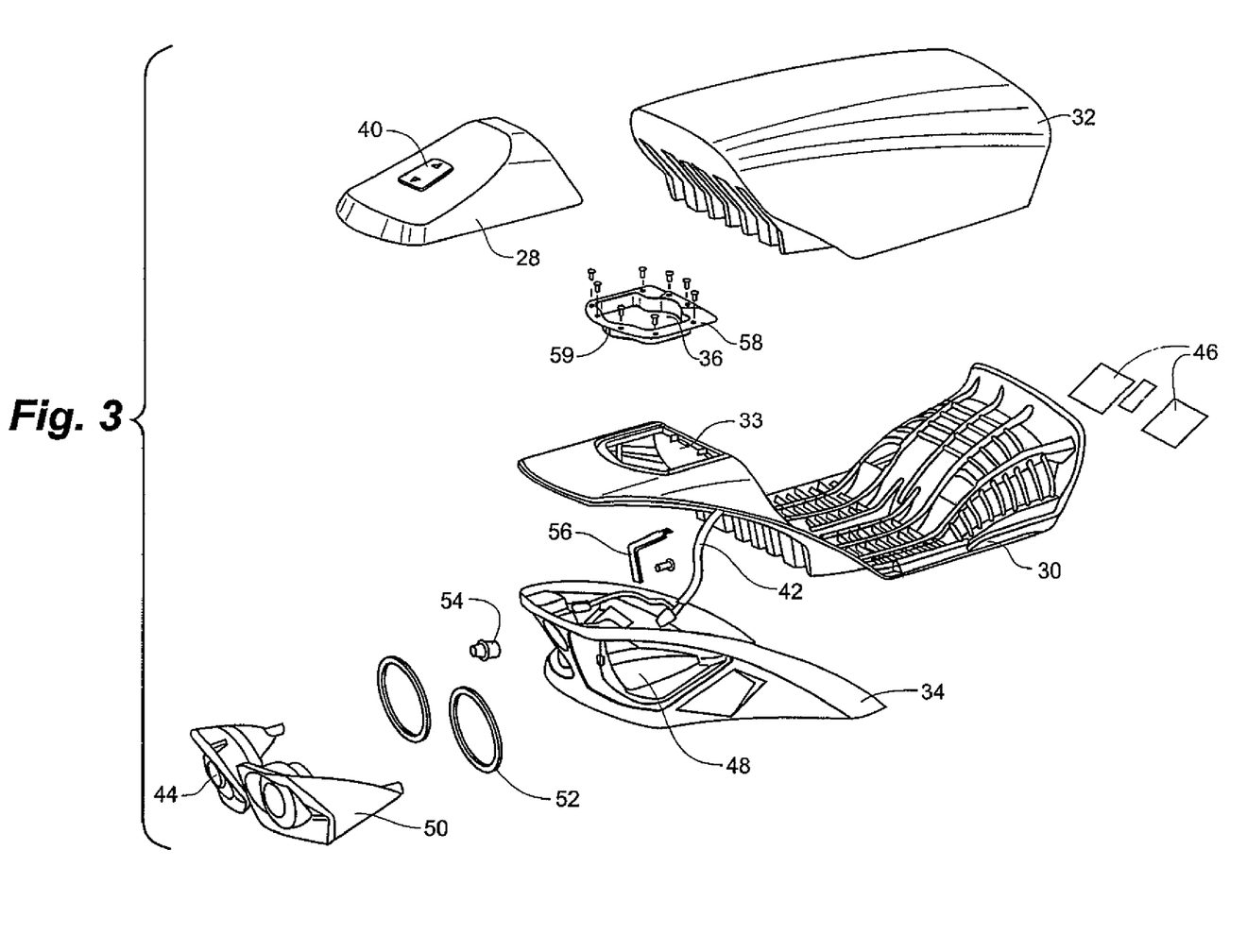
FIG. 3 is an exploded perspective view of the vehicle seat shown in FIG. 1.

The trunk enclosure 34 is disposed beneath the rear of the frame section 30. The trunk enclosure is more readily visible in FIG. 3. The trunk enclosure 34 preferably includes a stiff and lightweight plastic or metal. An embodiment of the trunk enclosure 34 is shown in FIG. 3 that is generally U-shaped when viewed from above the vehicle; however, any shape that provides an enclosed storage space when fitted to the frame section 32 and the chassis of the vehicle is suitable. The present invention can utilize the enclosed space, as is, for storage of items that are accessed through the adjustable backrest 28. Alternately, the storage space may be defined by a pocket or liner.

The adjustable backrest 28 is disposed on top of the frame section 30, towards the rear of the vehicle seat 18. The exterior of the adjustable backrest 28 preferably includes a comfortable yet supportive material, such as polyethylene foam. The adjustable backrest 28 is preferably generally rhomboid in shape, sloping downwards toward the rear. In a preferred embodiment, the front of the adjustable backrest 28 is incurvate to form a small depression in order to match the shape of a rider's back It is also preferable that the exposed edges of the adjustable backrest are rounded to prevent discomfort or injury to the rider. Extending from the base of the adjustable backrest 28 is the backrest connector 38, which is described in more detail below.

Figure 2B:
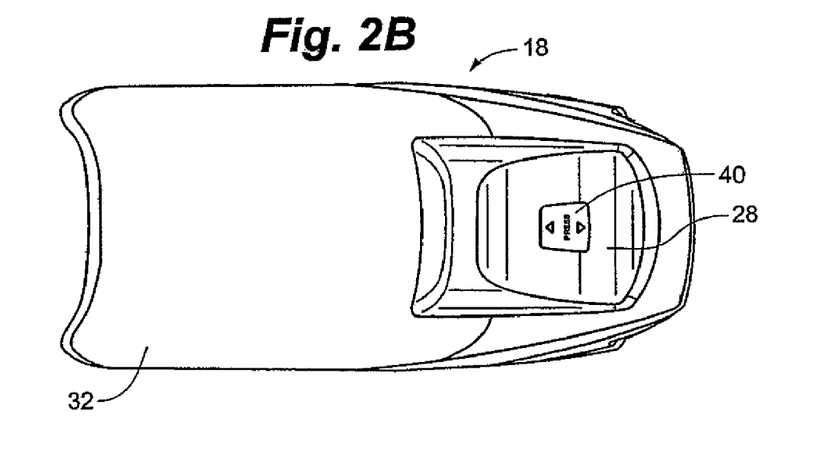
FIG. 2B is a top view of the vehicle seat shown in FIG. 1, according to an embodiment of the present invention.
Figure 4:
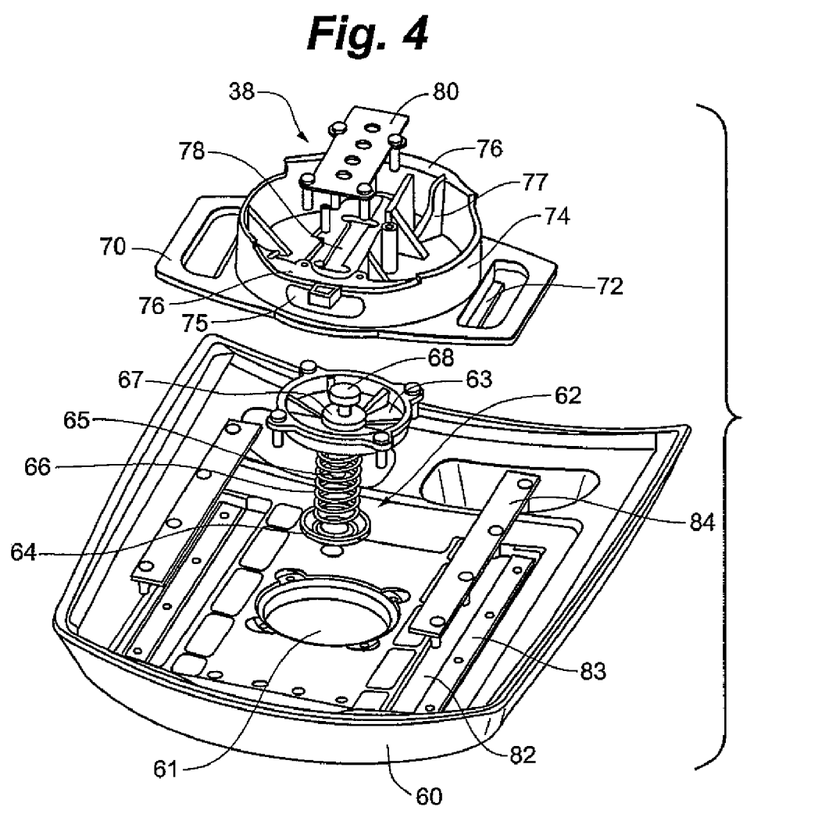
FIG. 4 is an exploded view from below, in perspective, of the adjustable backrest in accordance with an embodiment of the present invention.

FIG. 2B is a top view of the vehicle seat 18 shown in FIG. 1. The adjustable backrest 28 is disposed primarily over the frame section 30, but the front portion of the adjustable backrest 28 may overlap the seat cushion 32. The interior of the trunk enclosure 34 can be accessed by turning the adjustable backrest 28 ninety degrees to either side about a generally vertical axis 29 shown in FIG. 2A which is transverse to an upper surface 31 on which a rider sits, and then removing it from the seat 18 to reveal a storage space located in the trunk enclosure 34. In an alternate embodiment, the adjustable backrest 28 may be rotated 180 degrees to convert it between use as a backrest and use as a combination backrest and vehicle seat for an additional rider. The vehicle seat 18 may be provided with a lock mechanism to prevent undesired removal of the adjustable backrest 28. A backrest button mark 40 is located on the top of the adjustable backrest 28, and is a region of the surface of the adjustable backrest 28 marked to indicate the position of the backrest button mechanism. Pushing the backrest button mark 40 enables the adjustable backrest 28 to be moved backwards and forwards along the center line of the vehicle seat to create more comfortable seating for the rider. The details of the mechanism within the adjustable backrest 28 are shown in FIG. 4.

Figure 2C:
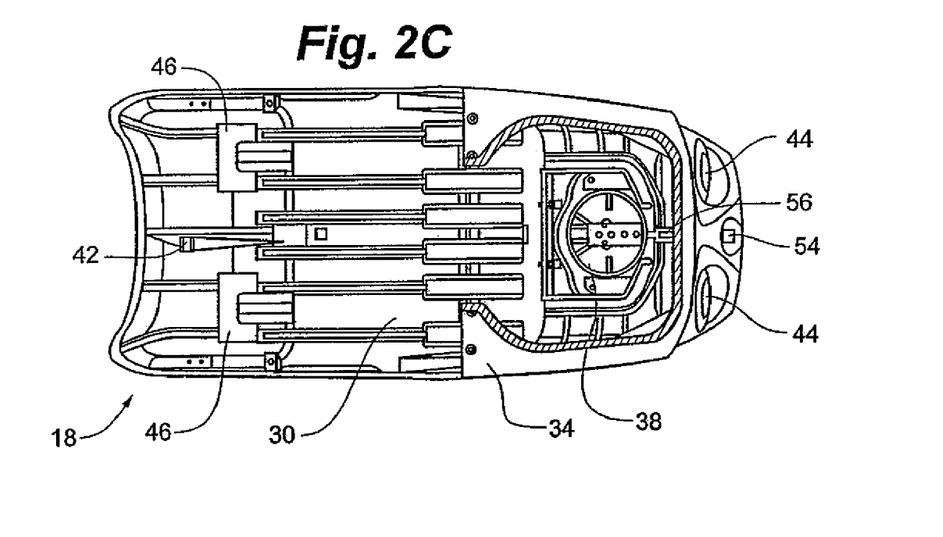
FIG. 2C is a bottom view of the vehicle seat shown in FIG. 1, according to an embodiment of the present invention.

FIG. 2C is a bottom view of the vehicle seat 18 shown in FIG. 2A and FIG. 2B, according to a preferred embodiment of the present invention. Prominent in the figure is the ribbing used to provide a strong yet light frame section 30 that serves as the backbone of the overall vehicle seat 18. Towards the front end and middle of the frame section 30 is the taillight wiring 42 which is used to deliver electric current to the one or more tail lights 44. The tail lights 44 are positioned at the rear of the vehicle seat 18, supported by taillight receptacles 48 on the trunk enclosure 34. One or more patch portions 46 are used to cover undesirable openings in the frame section 30.

FIG. 3 is an exploded perspective view of the vehicle seat 18 shown in FIGS. 2A-2C. This figure illustrates the various components of an embodiment of the vehicle seat 18, and how they are assembled together. The frame section 30 is positioned between the trunk enclosure 34 and the seat cushion 32, and contains an aperture 33 that is used to mount a trunk flange 58. The trunk flange 58 helps retain the adjustable backrest 28 while providing access to the interior of the trunk enclosure 34 through a storage access 36. The shape of the storage access 36 is defined by the trunk flange 58 which is mounted upon a cutout portion on the upper rear portion of the frame 30. The trunk flange 58 is preferably a stiff plastic or metal, and is attached to the surface of the frame 30 by screws or other appropriate attachment structure. The storage access 36 is generally rectangular, expanding to a circular portion in the middle. The long side of the rectangle runs perpendicular to the centerline of the snowmobile 10. The rear side of the rectangle contains a lock notch 59 at the center of the expanded circle portion, that provides part of the locking mechanism, described below. The shape of the storage access 36 should be configured to allow the removal of the adjustable backrest 36 only after the backrest has been rotated 90 degrees to either side.

The backrest button mark 40 provided on the upper surface of the adjustable backrest 28 actuates an adjustment mechanism when pressed, as will be described in detail hereinafter, which allows the backrest 28 to be moved forward or backward along the centerline of the seat to provide superior comfort for the rider. A lock button 54 is preferably provided so that the trunk enclosure 34 can be locked if desired. An L-shaped lock pin 56 is connected to the back of the lock button 54, and serves to unlock the adjustable backrest 28 by applying pressure against the lock peg 90, as described later with reference to FIGS. 6 and 7. FIG. 3 also shows the taillight assemblies of a preferred embodiment of the present invention in greater detail. The taillights 44 are held by taillight holders 50. Preferably, a foam ring 52 is installed behind each taillight 44 to provide a secure fit and prevent damage to the taillights 44. The combined taillight 44, taillight holder 50, and foam ring 52 are then secured within the taillight receptacles 48 in the trunk enclosure 34. The vehicle seat components are held together by various attachment devices, such as rivets or screws.

FIG. 4 is an exploded view in perspective from below of the adjustable backrest 28, in accordance with an embodiment of the present invention. The adjustable backrest 28 includes three basic components: a backrest body 60, a backrest connector 38, and a button mechanism 62. The backrest body 60 provides the bulk of the structure of the adjustable backrest 28, and is preferably formed of a comfortable yet supportive material, such as polyethylene foam.

The lower surface of the of the backrest body 60 is adapted to fit the surface of the vehicle seat. The lower surface of the backrest body 60 also contains two tracks 82. The tracks 82 are rectangular depressions in the lower surface of the backrest body 60, running parallel to one another and aligned with the centerline of the backrest. Adjacent to, and outside of, the tracks 82 are bracket support regions 83. Each bracket support region 83 is a line of material, slightly elevated relative to the tracks 82, that is used to support a track bracket 84. The bracket support region 83 is preferably provided with structure to allow attachment of the track bracket 84, such as screw holes. The track bracket 84 is made of a stiff and durable material such as stainless steel, and is attached to the bracket support region 83 by attachment devices such as screws. The track bracket 84 has generally the same length as the track 82 and the bracket support region 83, but is wider than either so that it partially covers the track 82 while resting on the bracket support region 83. In a preferred embodiment, the tracks 82 are about 8 inches long, which allows the adjustable backrest 28 to move over a range of about 4 inches, as the track guides 72 occupy about 4 inches, leaving 4 inches of track unoccupied by the track guides 72.

The backrest body 60 also contains a button cavity 61 which is a cavity that lies beneath the backrest button mark 40. The button cavity 61 creates a substantially thinner portion of backrest and provides room for the button mechanism 62 beneath the backrest button mark 40. The thin portion of the backrest above the button cavity 61 provides a soft spot in the backrest that allows force to be readily applied by the user to the backrest button mechanism. The backrest button mark 40 is generally a portion of the backrest body 60 which has been marked to indicate where the user should push on the surface in order to adjust the backrest.

The backrest connector 38 connects the backrest body 60 to the vehicle seat 18, while providing some of the mechanism that allows the adjustable backrest 28 to both rotate and move backwards and forwards along the seat. The part of the backrest connector 38 placed closest (proximal) to the backrest body 60 is the track platform 70. The track platform 70 has essentially the same shape (i.e., a rounded rectangle with a circular center) as the storage access 36 within the trunk flange 58, and generally rests over the storage access 36 when the adjustable backrest 28 has been placed on the vehicle seat 18. Extending beneath the track platform are two parallel track guides 72 that rest in the tracks 82 and are retained in place by the track brackets 84. The track guides 72 are L-shaped, when viewed in cross-section, and function to hold the backrest connector 38 to the backrest body 60 while allowing it to slide back and forth along the space defined by the tracks 82 and the track brackets 84.

Centered on the track platform 70 is a short mounting cylinder 74. The mounting cylinder 74 fits into the central, expanded portion of the trunk flange 58. The lower, distal end of the mounting cylinder 74 has two retaining lips 76, positioned on opposite sides of the mounting cylinder 74, that extend a short distance away from the mounting cylinder 74. The retaining lips 76 extend far enough outwards from the mounting cylinder 74 that they prevent removal of the adjustable backrest 38 when the backrest is in its normal, non-rotated position, by engaging the trunk flange 58. The adjustable backrest 28 can be removed after it has been rotated 90° about axis 29 shown in FIG. 2A since the retaining lips 76 do not extend to the edge of the broader portion of the storage access 36 aperture, and thus are not retained by the trunk flange 58 when oriented in this fashion. As the retaining lips 76 must be strong enough to reliably retain the adjustable backrest 28 on the vehicle seat 18, it is preferable to provide them with structural support such as bracing regions 77.

Figure 5:
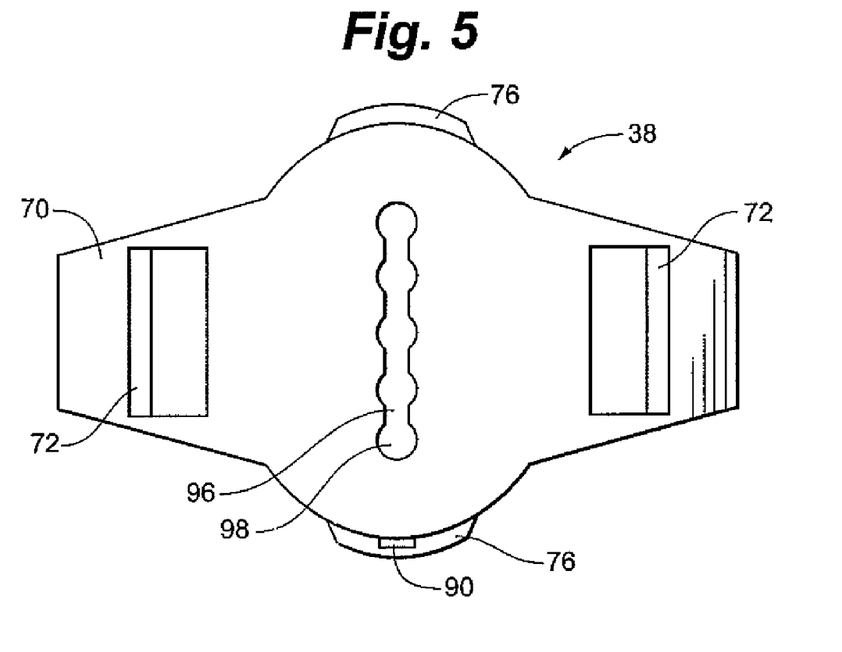
FIG. 5 is a top view of the backrest connector, in accordance with an embodiment of the present invention.

FIG. 5 shows a top view of the backrest connector 38. Running through the center of the track platform 70 of the backrest connector 38, and parallel to the track guides 72, is a slot aperture 96 including a plurality of connected circular apertures 98. The circular apertures 98 are substantially wider than the remainder of the slot aperture 96 that connects them, and are sized to fit a button peg 68 of the button mechanism 62. In a preferred embodiment, there are five connected circles, spaced about one inch apart, such that the adjustable seat may be moved to five different positions over a total range of movement of four inches. Note that while circular apertures 98 are shown in the figure, other shapes may function, so long as they are adapted to the shape of the button peg 68. Note, however, that a circular aperture 98 is preferable, as it allows the button peg 68 to fit regardless of rotation. Also visible in FIG. 5 are the retaining lips 76, the track guides 72, and the lock peg 90.

Figure 6:
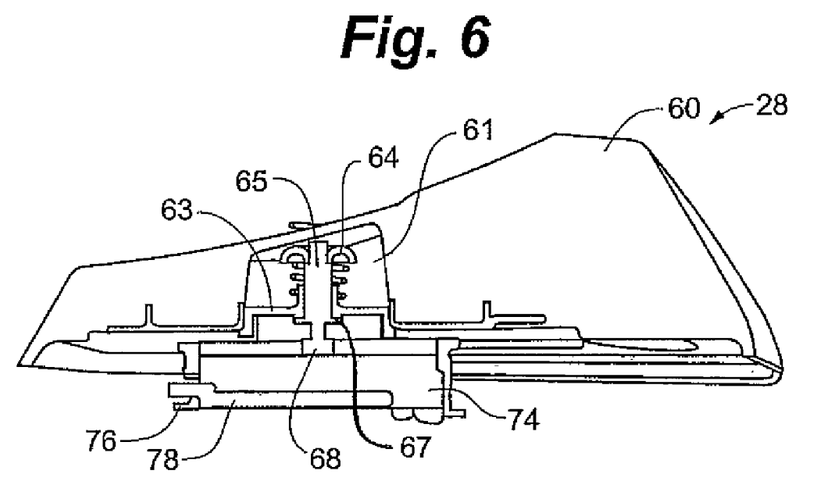
FIG. 6 is a side view of the adjustable backrest, in accordance with an embodiment of the present invention.

With reference to FIG. 4, the button mechanism 62 is a device that allows the adjustable backrest 28 to be moved from one position to another only when the backrest button mark 40 is pushed, and retains the adjustable backrest 28 in position when the backrest button mark 40 is released. The button mechanism 62 serves to transmit force from the push of the backrest button mark 40 to the button peg 68, which engages the circular apertures 98 of the slot aperture 96. In the embodiment shown in FIG. 4, the button mechanism 62 is generally a spring-actuated plunger. The button mechanism 62 includes a button knob 64, a spiral spring 66, a support dish 63, a button rod 65, a retainer disk 67, and a button peg 68. The button knob 64 is positioned nearest the backrest button mark 40. The spiral spring 66 extends from the button knob 64 to the support dish 63. When partially compressed, the button knob 64 contacts the button rod 65, which is mounted in a movable fashion within the support dish 63, as shown in FIG. 6. At the distal end of the button rod 65, is the retainer disk 67. Finally, at the distal end of the button rod 65 is the button peg 68. As noted above, the button peg 68 is sized to fit within one of the circular apertures 98. All of the components of the button mechanism 62 preferably include a durable and stiff plastic or metal with the exception of the plunger spring 66, which preferably is a resilient material.

When the backrest button mark 40 portion of the backrest is pushed, the button knob 64 underneath is also pushed, causing force to be transmitted along the button rod 65 to the button peg 68. This causes the button peg 68 to move out of a circular aperture 98 within the slot aperture 96 on the track platform 70. Once the button peg 68 has moved out of a circular aperture 98, the track platform 70 is free to move along the track 82. However, the plunger spring 66, which is compressed by pushing on the button knob 64, will exert an opposing force on the button knob 64 so that when the button peg 68 passes over another circular aperture 98, the button peg 68 will drop back into that particular circular aperture unless force continues to be applied against the button peg 64 to oppose the force of the plunger spring 66. Once the button peg 68 has dropped into a circular aperture 98, the adjustable backrest 38 will cease moving and remain in place. The retainer disk 67 prevents the button knob 64 from extending too far underneath the button mark 40, potentially creating a bump on the seat surface, when the mark is not being pushed by abutting against the plunger support dish 63. The retainer disk 67 also prevents the button peg 68 from moving too far within the backrest connector 38 when pushed by abutting up against the track platform 70. Thus, the retainer disk 67 serves to limit motion of the button mechanism 62 in either direction.

FIG. 6 shows a side view of the adjustable backrest 28 in accordance with an embodiment of the present invention, which illustrates the button mechanism 62 described above, as well as the backrest locking mechanism. It is desirable to be able to prevent access to the storage cavity within the vehicle seat so that items may be held securely, and to prevent rotation of the adjustable backrest 28 except when needed to enable removal of the backrest. It is further desirable that the backrest lock into one position only to prevent the backrest from being improperly aligned by the user. These functions are accomplished by the backrest locking mechanism. The backrest locking mechanism includes a backrest lock 78 which is positioned within the mounting cylinder 74 on the backrest connector 38. An embodiment of the backrest lock 78 is shown in greater detail in FIG. 7. The backrest lock 78 is preferably mounted over the slot aperture 96 such that it runs along the central axis of the backrest connector 38. The backrest lock 78 provides a way of extending a lock peg 90 outwards from the mounting cylinder to engage the lock notch 59, preventing rotation of the adjustable backrest 28. The embodiment of the backrest lock 78 shown in FIGS. 6 and 7 uses a spring to extend the lock peg 90 outwards. The backrest lock shown in the Figures includes a mounting bracket 80, a lock retainer 92, a lock spring 86, a spring rod 94, a lock arm 88, and a lock peg 90. The mounting bracket 80 is a generally rectangular section that is used to secure the locking pin 78 to the backrest connector 38, by screws or other suitable attachment devices. At one end of the mounting bracket, distal from the lock peg 90, is the lock retainer 92. The lock retainer 92 is a portion of the mounting bracket 80, bent at about 90 degrees relative to the mounting bracket, that contains an aperture adapted to fit the spring rod 94. Slidably mounted to the mounting bracket 80 is the lock arm 88. The lock arm 88 is a rectangular piece of material with a spring rod 94 at the end near the lock retainer 92, and the rectangular lock peg 90 at the other end. Wrapped around the spring rod 94 is the spiral lock spring 86, which serves to push the lock arm 88 away from the lock retainer 92. The spring rod 94 extends into the lock retainer 92 to prevent the lock arm 88 from losing alignment.

Figure 7:
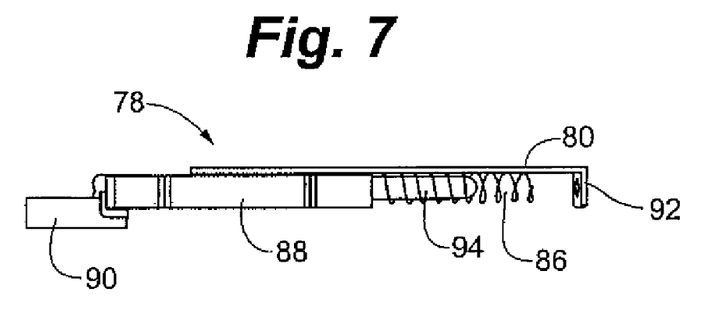
FIG. 7 is a side view of the lock mechanism compression spring used in an embodiment of the adjustable backrest of the present invention.

The lock mechanism generally functions as follows. When in the locked position, the lock peg 90 extends outwards through a peg aperture 75 at the rear of the mounting cylinder 74, as seen in FIG. 4. The lock peg 90 extends beyond the peg aperture 75 into the lock notch 59 on the trunk flange 58. The lock peg 90 is retained in this position by pressure from the lock spring 86. When the lock peg 90 is engaged within the lock notch 59, it prevents the rotation of the adjustable backrest 28 around the mounting cylinder 74 within the trunk flange 58. However, when the lock button 54 is pushed, the lock pin 56 presses against the lock peg 90, pushing it out of the lock notch 59. As this occurs, the spring rod 94 is pushed further back through the aperture in the lock retainer 92. Once the lock peg 90 is no longer engaged by the lock notch 59, the adjustable backrest 28 is able to rotate freely, so that it can be rotated 90 degrees. After rotation, the retaining lips 76 of the mounting cylinder 74 are aligned with the wider, rectangular portion of the trunk flange 58, allowing the adjustable backrest 28 to be removed from the vehicle seat 18 to provide access to the trunk storage cavity. When the adjustable backrest is returned to its normal position, the lock spring 86 serves to push the lock peg 90 back through the aperture and into the lock notch 59, which again locks the adjustable backrest 28 in position and prevents rotation.

Several additional embodiments of the adjustable seat 18 of the present invention, using various different adjustable backrests 28, will now be described. These additional embodiments are intended to illustrate the diversity of design available based on the principles of the present invention, and are not intended to limit the present invention to the precise embodiments shown. These embodiments all provide an adjustable backrest which must be rotated prior to removal, and that may be adjusted back and forth, as well as providing additional features that allows a user to configure their vehicle seat to provide the optimal backrest for expected vehicle usage.

Figure 8:
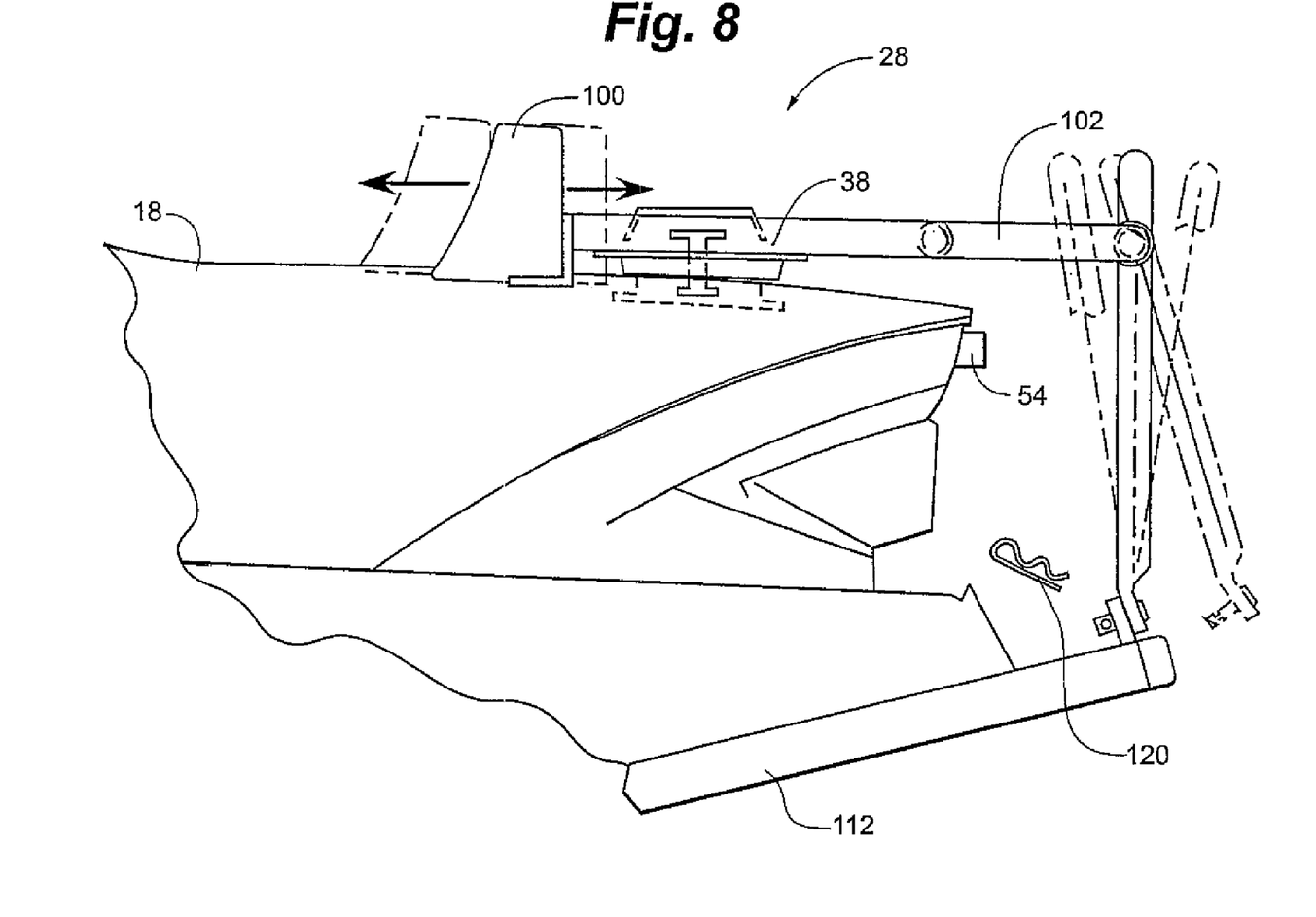
FIG. 8 is a side view of the adjustable backrest with a quick removal rack, according to an embodiment of the present invention.
Figure 9:
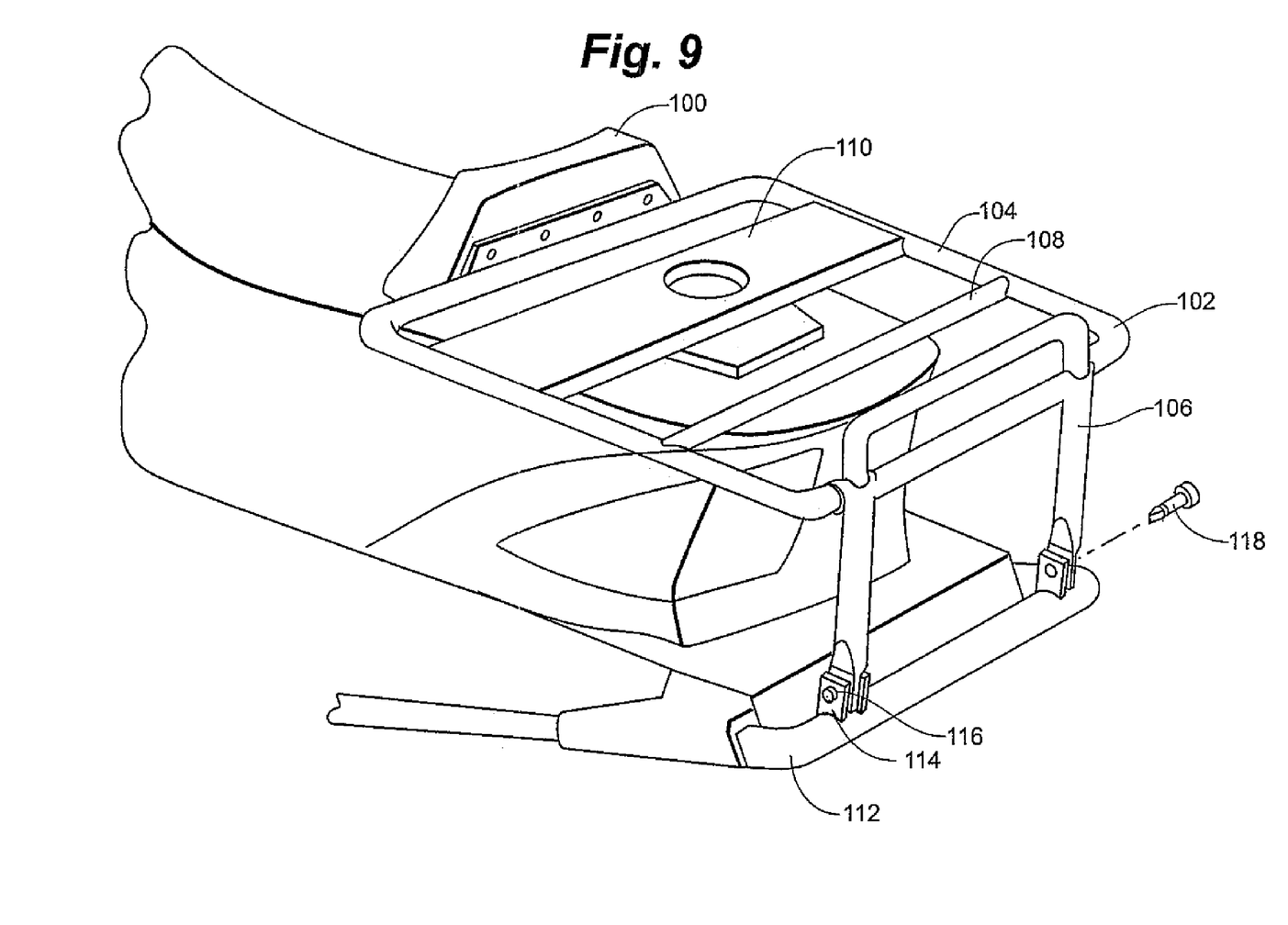
FIG. 9 is a perspective view of the adjustable backrest with a quick removal rack, according to an embodiment of the present invention.

The first of these additional embodiments is an adjustable backrest with a quick removal rack, shown in side view in FIG. 8 and in perspective view in FIG. 9. In this embodiment, a portion of the backrest is replaced with a item rack or other accessory support structure in order to enhance the carrying capacity of a vehicle so equipped. This type of backrest thus consists of two primary components; a truncated backrest 100 and a item rack 102. The truncated backrest 100 is a simplified version of the backrest 28 described above. The truncated backrest 100 is operably connected to a backrest connector 38, which provides the capability to rotate and remove the truncated backrest 100 and the associated item rack 102 from the vehicle seat 18. While a variety of configurations of the item rack are possible, FIGS. 8 and 9 shown an embodiment in which the item rack includes two approximately perpendicular planar sections; an upper rack section 104 and a rear rack section 106. These two sections may be rotatably connected to facilitate the attachment and removal of the item rack 102, as described in detail below. The item rack may be constructed of hollow tubing using a strong and resilient material such as stainless steel, using one or more bars 108 to provide for greater strength and support of items. A button aperture 110 may be provided to allow for access to the button knob 64. The item rack may be configured to carry luggage or general cargo.

In the embodiment shown in FIGS. 8 and 9, the item rack 102 may be further secured to the vehicle by attachment to the rear bumper 112. This additional attachment is optional, but may be desirable when significant stress is expected to be placed upon the item rack 102. To enable attachment to the rear bumper 112, the bumper may be provided with one or more attachment projections 114 containing holes 116. One or more bars of the rear rack section 106 are shaped so that their ends fit snugly adjacent to or between the attachment projections 114, and contain holes that are aligned with the holes 116 in the attachment projections 114 such that a pin 118 can be inserted through all of the holes. The pin 118 may then be secured in place using a lock pin 120. Various other attachment devices may also be used without departing from the scope of the present invention. In order to remove the adjustable backrest with a quick removal rack, the ends of the rear rack section 106 are detached from the rear bumper 112 by removing the lock pin 120 and pin 118 and swinging the rear rack section 106 outward away from the rear bumper 112. The lock button 54 is then pressed to disengage the backrest connector 38, allowing it to be rotated. The adjustable backrest with quick removal rack can then be turned 90 degrees and removed by lifting it out of the vehicle seat 18.

Figure 10:
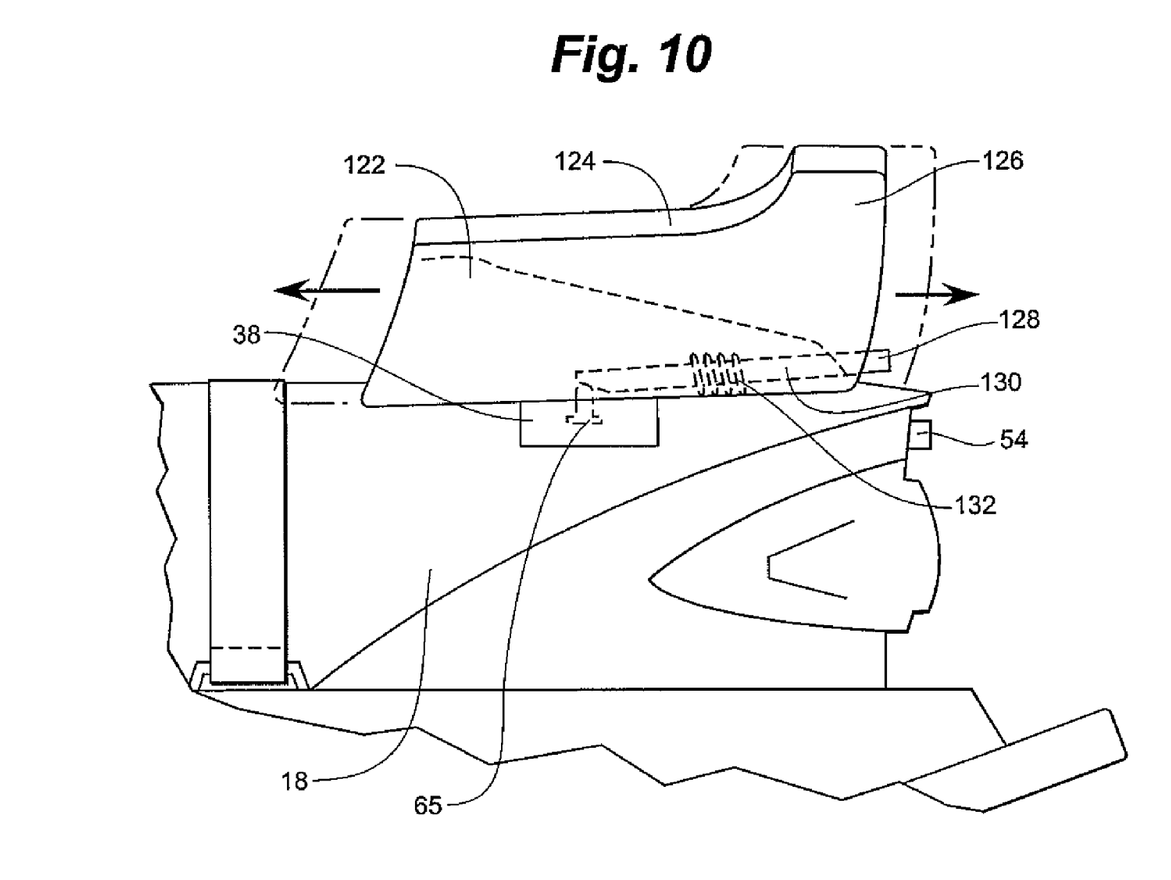
FIG. 10 is a side view of a two-person adjustable backrest, according to an embodiment of the adjustable seat of the present invention.

An additional embodiment of the present invention is shown in FIG. 10, which illustrates a side view of a two-person adjustable backrest 122. In this embodiment, the backrest 28 is configured to allow for the comfortable seating of a passenger behind the driver of the vehicle. Thus, in this embodiment, the adjustable backrest serves as both a backrest for the driver, and a seat for the passenger. To provide this function, the adjustable backrest 122 shown in FIG. 10 is modified in order to provide greater comfort and support for a passenger. First, the two-person adjustable backrest 122 is provided with additional region of foam cushion 124 on its surface, where the passenger will be seated. Second, the backrest 122 is provided with a crest 126 at the rear of the backrest 122 to support the passenger and help prevent the passenger from slipping off the rear of the vehicle 10 when the vehicle 10 accelerates forward. The backrest is also generally more planar in structure to provide a surface more suited to supporting a rider.

The two-person adjustable backrest 122 is provided with an adjustment button 128 that allows the seat to be adjusted forwards and backwards when pushed. The adjustment button 128 is positioned at the rear of the backrest 122, and reaches the backrest connector 38 by way of a adjustment rod 130. The distal end of the adjustment rod is tapered to act as a ramp to compress the button rod 65 downward when the adjustment rod 130 is pushed inwards by pressure on the adjustment button 128. This disengages the backrest, allowing adjustment forward and backwards. The adjustment rod 130 is provided with a spring 132 to oppose pressure on the adjustment button 128 and return the button 128 and the associated adjustment rod 130 to their normal extended position when pressure is not being applied. To remove the two-person adjustable backrest, the lock button 54 is pressed to disengage the backrest connector 38, allowing it to rotate. The two-person adjustable backrest 122 can then be turned 90 degrees and removed by lifting it out of the vehicle seat 18.

Figure 11:
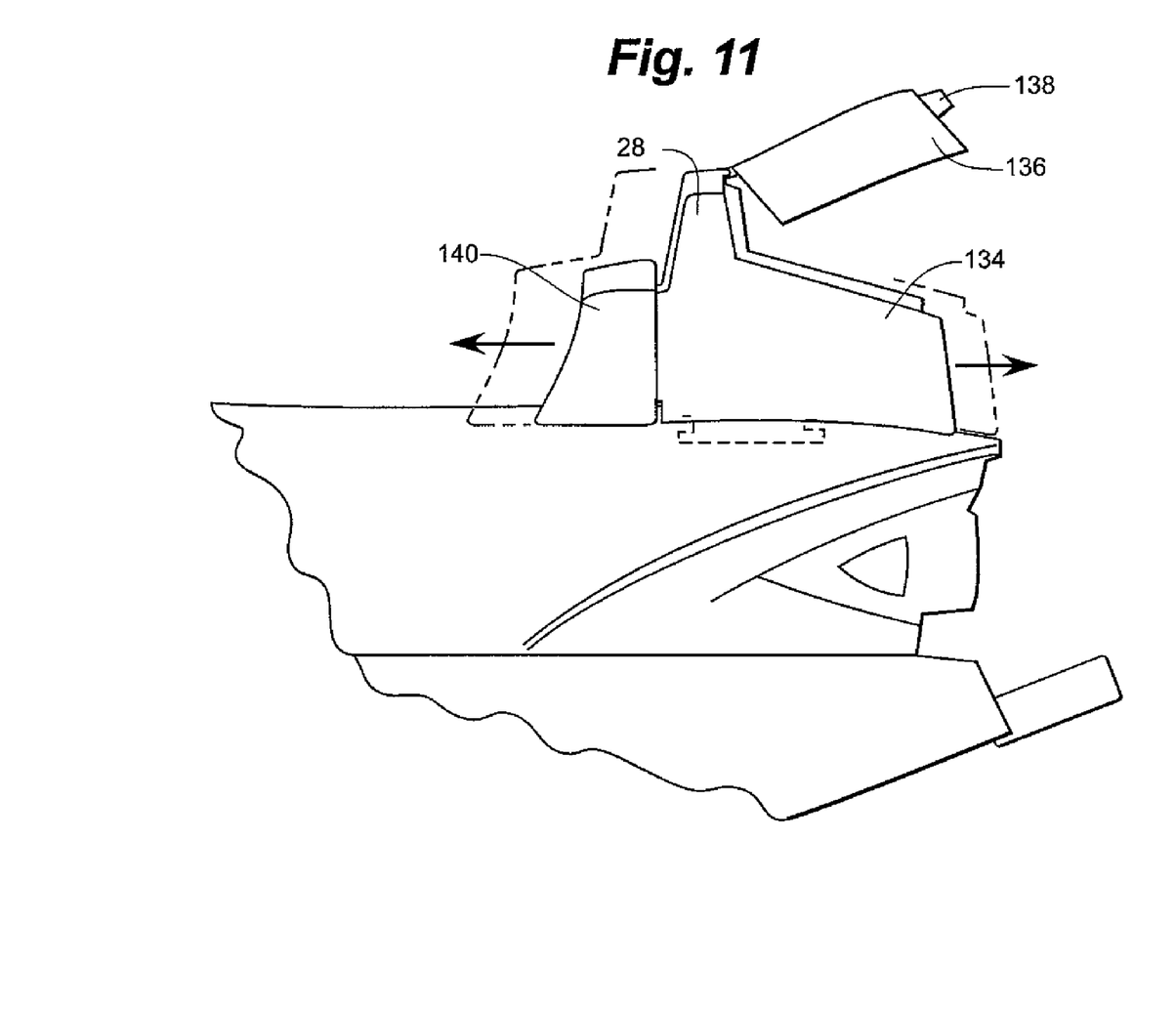
FIG. 11 is a side view of an adjustable backrest with internal storage, according to an embodiment of the adjustable seat of the present invention.

Another embodiment of the present invention is shown in FIG. 11, which illustrates a side view of an adjustable backrest 28 with internal storage. This embodiment provides additional storage capacity within the backrest itself to supplement the storage cavity in the trunk enclosure 34 that is accessible by removal of the adjustable backrest 28. The rear portion of adjustable backrest includes a hollow storage region 134, which may be configured for general storage or for specific applications, such as carrying an ice fishing bucket. The hollow storage region 134 may be provided with a lid 136 to cover the storage region. Use of a lid 136 also allows the storage space to be locked using a push button lock 138 or other locking systems. The front of the adjustable backrest 28 with internal storage is provided with a backrest cushion 140, generally made of a compressible material such as an expanded polypropylene closed cell foam. The adjustable backrest can be adjusted forwards and backwards and removed after turning it 90 degrees using the mechanism already described. While movement of the adjustable backrest can be actuated using a variety of methods, such as a button on the lower surface of the storage area, a preferred method of enabling adjustment of the backrest is through use of an adjustment button 128 provided at the rear of the backrest, as described for the two-person adjustable backrest 122 above.

Figure 12:
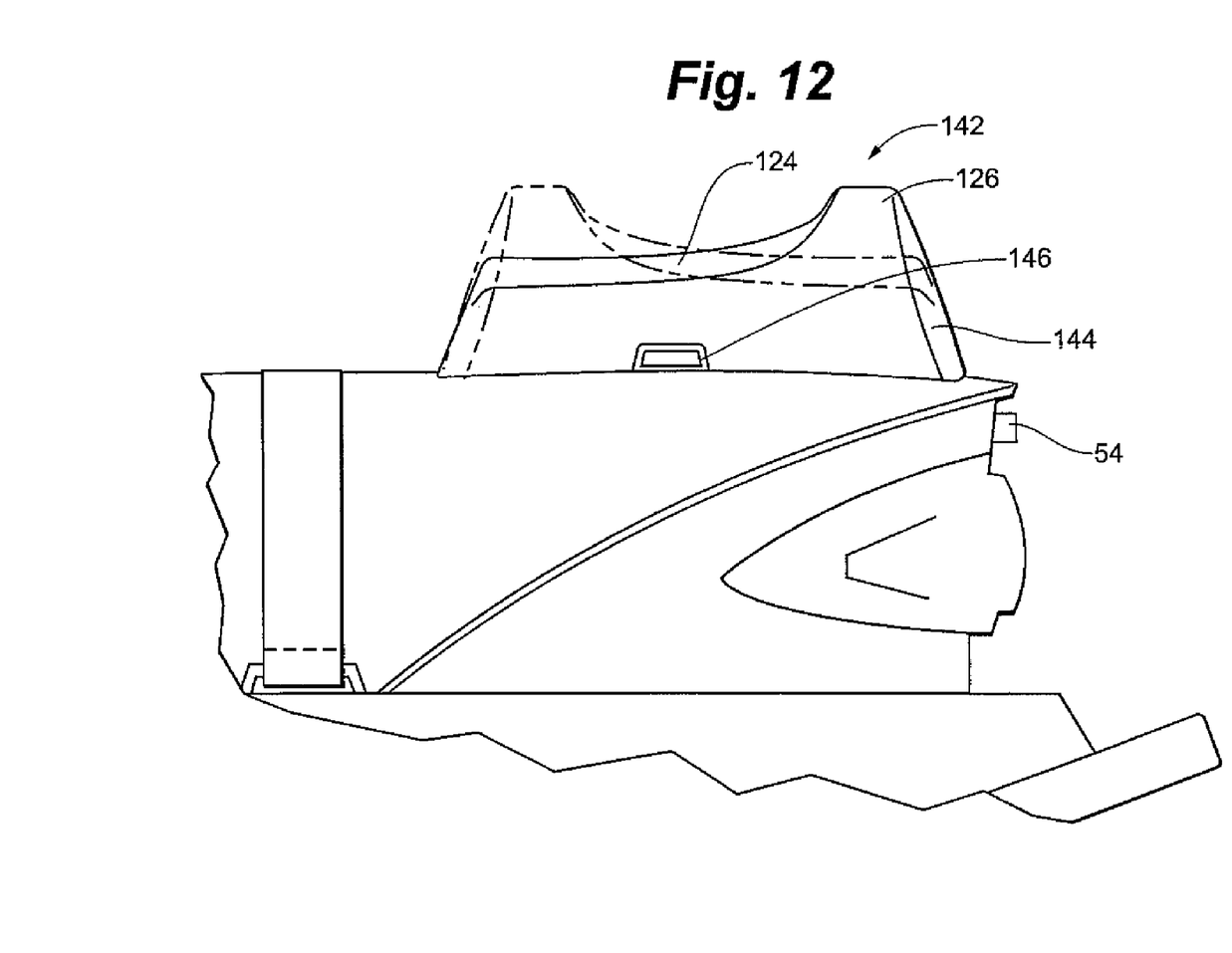
FIG. 12 is a side view of a one or two-person convertible backrest, according to an embodiment of the adjustable seat of the present invention.

FIG. 12 represents a side view of a convertible backrest 142 that can accommodate one or two people, according to an embodiment of the present invention. This embodiment of the adjustable backrest shares some of the features of the two-person adjustable backrest, in that it is provided with an additional region of foam cushion 124 on its surface where the passenger will be seated and is provided with a crest 126 at the rear of the backrest 142 to support the passenger. However, this embodiment of the present invention allows the backrest to be rotated 180 degrees to enable it to be optimized either for one or two riders on the vehicle. An additional lock peg (not shown) should be provided on the track platform 70 opposite the existing lock peg 90 so that the seat can be locked into position after 180 degree rotation. When oriented such that the crest 126 is positioned towards the rear, the adjustable backrest can serve to carry a passenger behind the driver. However, if the backrest is rotated 180 degrees, it provides a larger backrest which slopes downwards towards the rear of the vehicle. A portion of the adjustable backrest adjacent to the back of the rider in the one person configuration may be provided with a region of foam cushion 144 to increase rider comfort. To unlock the convertible backrest 142 to allow rotation, the lock button 54 is pressed. The convertible backrest 142 can then be rotated 90 degrees and withdrawn from the seat, or it can be turned a full 180 degrees and then re-locked into position by releasing the lock button 54 to convert it from the one person configuration to the two person configuration, or vice versa. The convertible backrest 142 can also be adjusted backwards and forwards by pushing a side adjustment button 146, which operates in the same fashion as the rear-mounted adjustment button 128 described for the two-seat adjustable backrest 122.

It is to be understood that the described preferred embodiments of the invention are illustrative only, and that modifications thereof may occur to those of ordinary skill in the art. Accordingly, this invention is not to be regarded as limited to the preferred embodiments disclosed, but is to be limited only as defined by the appended claims herein.

What is claimed is:

1. A vehicle seat comprising:
    (a) a frame section having an aperture extending therethrough;
    (b) a cushion disposed on the frame section, the cushion having an upper surface on which a rider may sit;
    (c) a trunk enclosure of the frame section, the trunk enclosure defining a storage cavity for holding items; and
    (d) a rider support body disposed over the aperture on the frame section, wherein the rider support body is configured for removal from the frame section to enable access to the storage cavity through the aperture provided in the frame section, the rider support body configured for removal by rotating the rider support body about a vertical axis and lifting the rider support body from the frame section.

2. The vehicle seat according to claim 1, wherein the rider support body is repositionable backwards and forwards to various points over the frame section.

3. The vehicle seat of claim 2 wherein the rider support body is a backrest, and the vehicle seat may be converted between use for a single rider and two riders by rotating the backrest 180 degrees on the vehicle seat to reverse its alignment.

4. The vehicle seat according to claim 1, wherein the rider support body includes a button that enables repositioning of the rider support body when pushed.

5. The vehicle seat according to claim 1, wherein the rider support body is removable by rotating the body about 90 degrees and lifting the body from the frame section.

6. The vehicle seat according to claim 1, wherein the rider support body is adapted for use as at least one of a backrest for a vehicle driver, a storage compartment, an item rack, and a seat for a vehicle passenger.

7. The vehicle seat according to claim 1 wherein the vehicle is selected from the group consisting of snowmobiles, all terrain vehicles, personal watercraft, riding lawnmowers, and utility tractors.

8. A storage seat for a vehicle, comprising:
(a) a vehicle seat having a cavity in which items can be stored, the vehicle seat having a flange defining a storage access opening;
(b) a backrest disposed on the vehicle seat and positioned over the cavity, the backrest having a connector configured to engage the flange, and wherein the backrest is detachable from the vehicle seat by rotating the backrest about a generally vertical axis to permit removal of the connector from the flange; and
(c) means for preventing the removal of the backrest from the vehicle seat, the preventing means being selectively coupled between the backrest and the vehicle seat to selectively prevent rotation of the connector relative to the flange.

9. The storage seat according to claim 8, wherein the preventing means includes a spring biased lock peg coupled the connector and configured to engage a lock notch of the flange to prevent rotation of the backrest relative to the seat.

10. The storage seat according to claim 9, further comprising an actuator to selectively release the lock peg from the lock notch of the flange to permit rotation of the backrest relative to the seat.

11. The storage seat according to claim 8, wherein the backrest is rotatable about an axis transverse to an upper surface of the vehicle seat to move the backrest to the rotated, released position.

12. The storage seat according to claim 8, wherein the preventing means is a mechanism that when extended is adapted to contact both the backrest and the flange so as to prevent rotation of the backrest with respect to the flange.

13. The storage seat according to claim 12, wherein the mechanism when activated via an activator is adapted to withdraw from the flange so as to permit rotation of the backrest with respect to the flange when activated.

14. The storage seat according to claim 12, wherein the mechanism is a spring-mounted peg.

15. The storage seat according to claim 13, wherein the activator is operatively coupled to the vehicle seat, and wherein the activator is adapted to be triggered via a push button.

16. A snowmobile comprising:
a chassis;
a vehicle seat mounted to the chassis, the seat having an upper surface on which a rider may sit;
a pair of handlebars carried by the chassis adjacent to the vehicle seat;
an endless track carried by a rear suspension system mounted to the chassis;
a front suspension system mounted to the chassis;
left and right steerable skis carried by the front suspension system, the skis being steerably connected to the handlebars;
a storage cavity within the vehicle seat in which items can be stored;
a backrest disposed on the vehicle seat and positioned over the storage cavity, the backrest configured to prevent access to the storage cavity when positioned on the vehicle seat and configured to allow access to the storage cavity when removed from the vehicle seat, and the backrest adapted for removal from the vehicle seat by rotating the backrest about a generally vertical axis transverse to the upper surface to the seat from a normal mounting position in which the backrest is secured to the vehicle seat to a rotated, released position in which the backrest is released from the vehicle seat.

17. The snowmobile of claim 16, wherein the vehicle seat further comprises:
(a) a frame section having an aperture extending therethrough;
(b) a cushion section disposed on the frame section, wherein the cushion section defines the upper surface on which a rider may sit; and
(c) a trunk enclosure of the frame section, wherein the trunk enclosure defines the storage cavity.

18. The snowmobile of claim 16, wherein the backrest is adapted for removal by rotating the backrest about 90 degrees about the axis from the normal mounting position to the rotated, released position.

19. A storage seat for a vehicle, comprising:
a vehicle seat having a cavity in which items can be stored, the vehicle seat having a flange defining a storage access opening;
a rider support body configured to be removably coupled to the vehicle seat and positioned over the storage access opening; and
a mounting cylinder coupled to the rider support body, the mounting cylinder having at least one retaining lip configured to engage the flange in a mounting position to secure the rider support body to the vehicle seat, the rider support body and the mounting cylinder being rotatable about an axis transverse to an upper surface of the vehicle seat until the at least one retaining lip is disengaged from the flange to permit removal of the rider support body from the vehicle seat, thereby providing access to the cavity through the storage access opening.

20. The apparatus of claim 19, further comprising a lock selectively coupled between the mounting cylinder and the flange to prevent rotation of the mounting cylinder and the rider support body relative to the flange and the seat.

21. The apparatus of claim 20, further comprising an actuator to selectively disengage the lock to permit rotation of the rider support body relative to the seat.

* * * * *